United States Patent [19]

Aszman

[11] Patent Number: 4,820,579

[45] Date of Patent: Apr. 11, 1989

[54] SCRUBBER PAD

[75] Inventor: Harry W. Aszman, Englishtown, N.J.

[73] Assignee: Colgate-Palmolive Company, New York, N.Y.

[21] Appl. No.: 202,473

[22] Filed: Jun. 7, 1988

[51] Int. Cl.[4] .......... C11D 17/00; B32B 3/26; B32B 9/00

[52] U.S. Cl. .......... 428/304.4; 252/91; 252/92; 401/201; 428/305.5; 428/316.6

[58] Field of Search .......... 252/91, 92, 93; 401/201; 428/296, 304.4, 305.5, 316.6

[56] References Cited

U.S. PATENT DOCUMENTS

| | | | |
|---|---|---|---|
| 3,066,347 | 12/1962 | Vosbikian et al. | 401/201 |
| 3,175,331 | 3/1965 | Klein | 401/201 |
| 3,428,405 | 2/1969 | Posner | 401/201 |
| 3,581,447 | 6/1971 | Falivene | 51/400 |
| 3,949,137 | 4/1976 | Akrongold et al. | 252/92 |
| 4,203,857 | 5/1980 | Dugan | 252/92 |
| 4,240,760 | 12/1980 | Levine | 252/93 |
| 4,438,010 | 3/1984 | Lindauer et al. | 252/91 |
| 4,460,644 | 7/1984 | Pavlich | 428/305.5 |
| 4,665,580 | 5/1987 | Morris | 15/118 |

*Primary Examiner*—William J. Van Balen

*Attorney, Agent, or Firm*—Robert Sullivan; Richard Ancel; Murray Grill

[57] ABSTRACT

A scrubber pad preferably of flat rectangular parallelpiped-shaped characterized by good cleaning properties, safety to surfaces, and soap retention, prepared by, selecting a polyester polyurethane foam having the desired density and porosity, binding a polyesters spun bonded non-woven material to one side of said foam, impregnating the foam with a detergent formulation containing alkyl aryl sulfonate, sodium carbonate, magnesium sulfate and sodium sulfate, perfume and water. Cutting the impregnated product into pads of the desired shape and size and sealing the edges of the pads by application of the adhesive.

9 Claims, 4 Drawing Sheets

Fig. 1
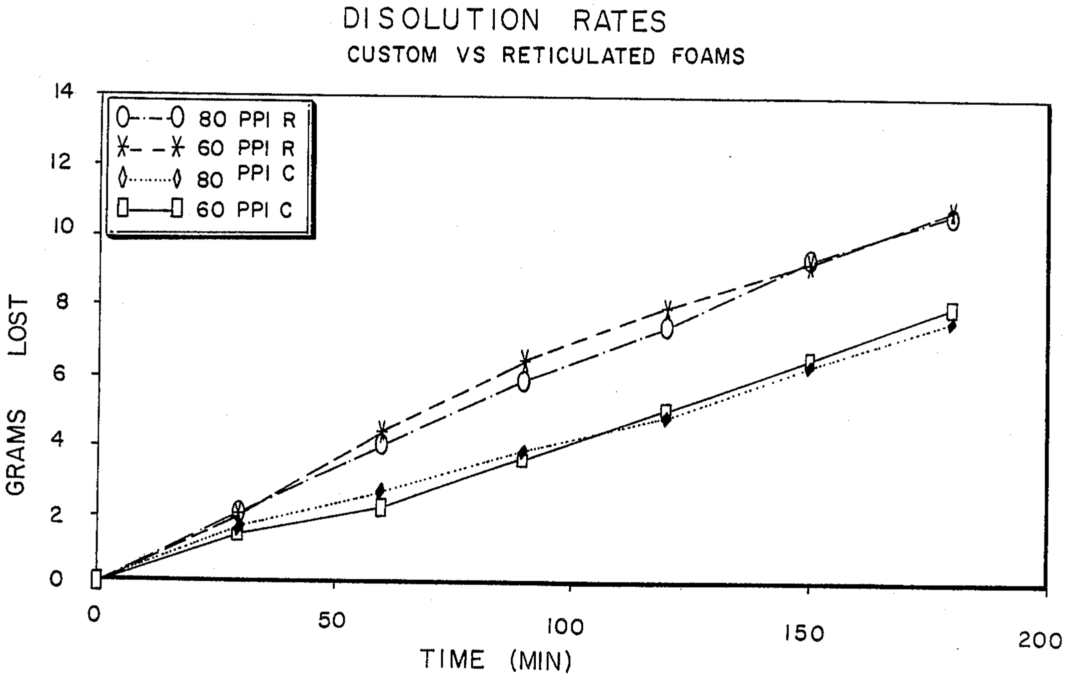
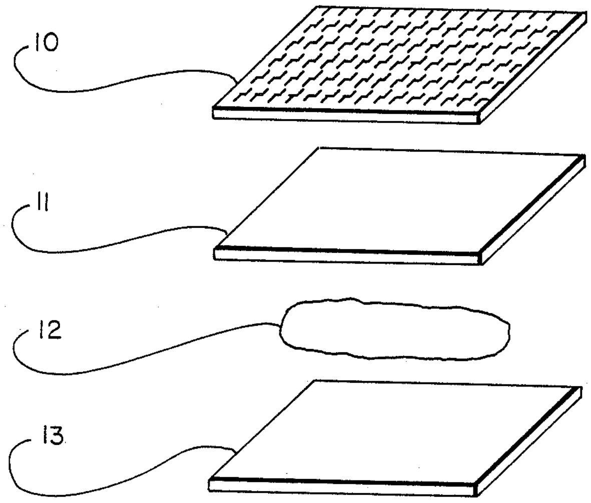
Fig. 6

SCRUBBER PAD

BACKGROUND OF THE INVENTION

It is known to form scrubbing or scouring pads of reticulated foam material which are efficient for scrubbing pots and pans, especially those lined with polytetrafluoroethylene ("Teflon"-registered trademark). It is also known to make scouring pads made of steel wool having a soap or other cleanser permeated into the interstices of the steel wool. In the latter type pad the effective life is generally ended when the soap or cleansing material is exhausted and the user must therefore be careful not be use too much water with the scouring pads Various combinations of different materials for preparing these pads have been disclosed in U.S. Pat. Nos. 3,066,347 to Vosbikian et al, 3,175,331 to Klein, 3,428,405 to Posner, 3,581,447 to Fallvene, 4,665,580 to Morris and 4,203,857 to Dugan.

SUMMARY OF THE INVENTION

It is an object of the present invention to provide scouring pads which can be used to clean utensils coated with Teflon that are characterized by good cleaning properties, safety to surfaces and detergent retention.

It is further object of the invention to provide a scrubbing pad that has the edges sealed with an adhesive.

DESCRIPTION OF THE DRAWINGS

FIG. 1 a graph comparing the dissolution rates of custom and reticulated foams.

FIG. 6 is a schematic view showing the elements of the scrubber pad.

DESCRIPTION OF THE INVENTION

As is pointed out above, the longevity of the detergent in the scrubber is of prime importance and it is of course dependent on the choosing an appropriate foam. Polyester polyurethane foams are preferred over polyether polyurethane foam, because polyether polyurethane foams tear easier. The characteristics which can be varied in these foams are density, pore size, if they are clickable or non-clickable and if they are reticulated or custom. A non-clickable foam is one which sticks together when cut and doesn't have memory. A clickable foam has memory and does not stick together when cut. A custom foam is one in which the "windows" created during the manufacturing process are left in place. Reticulated foams are foams in which the windows are removed by either a chemical process such as quenching with a sodium hydroxide or potassium hydroxide solution or a mechanical process.

A dunk tester, a device in which the material to be tested, such as a foam is succesively dipped into a vessel containing the appropriate quantity of a fluid, was used to measure the difference between foams for densities, pore size and custom or reticulated. The dissolution rate of foams as a function of density was determined for foams having densities of 2, 4 and 6 pounds per cubic foot using the dunk test.

Figure 2:
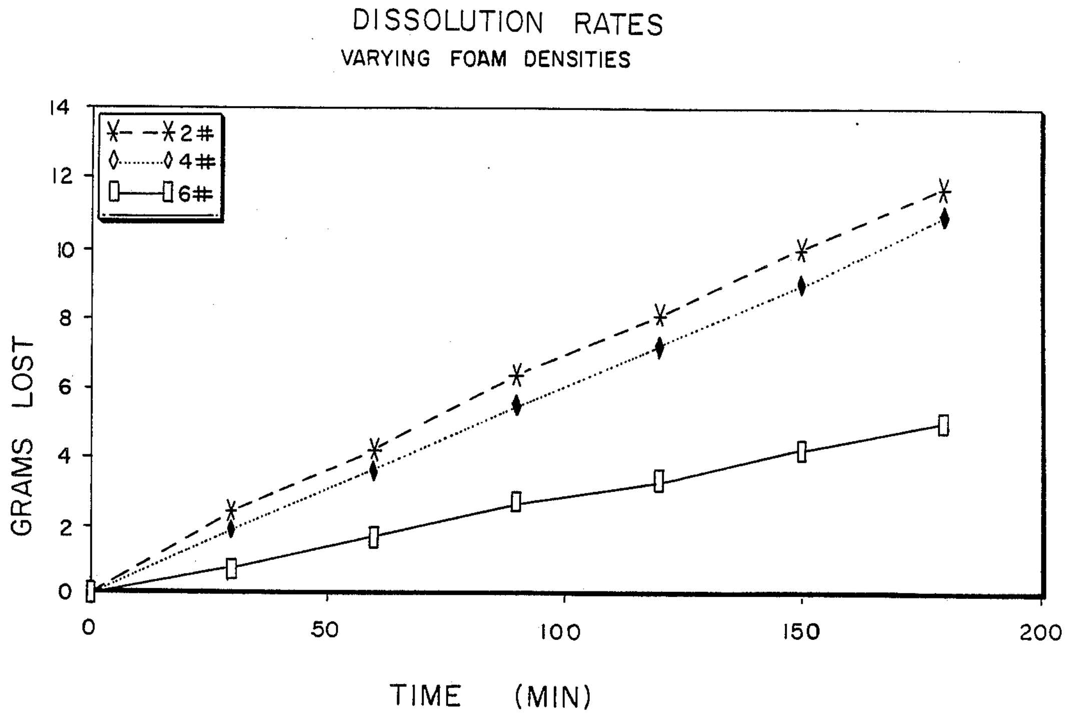
FIG. 2 is a graph comparing the dissolution rates as a function of foam density

The data collected are set out in Table I and presented graphically in FIG. 2

TABLE I

| | Grams lost after time in minutes | | | | | |
|---|---|---|---|---|---|---|
| Density | 30 | 60 | 90 | 120 | 150 | 180 |
| 2 | 2.4 | 4.2 | 6.4 | 8.1 | 10.1 | 11.7 |
| 4 | 1.9 | 3.6 | 5.5 | 7.2 | 9.0 | 10.9 |
| 6 | 0.7 | 1.7 | 2.7 | 3.3 | 4.2 | 5.0 |

All of these foams give satisfactory results. The foams having a density of 6 lbs per cubic foot have the best product life. However, because of cost and other considerations a foam having a density of 2 lbs per cubic foot is preferred.

Another important characteristic of the foam is the pores per inch. Foams having 60, 80 or 100 pores per inch ("ppi") were evaluated for detergent use-up using the dunk tester described above. The dissolution rate for foams as a function of pores per inch was determined for foams having porosities of 60, 80 and 100 pores per inch.

Figure 3:
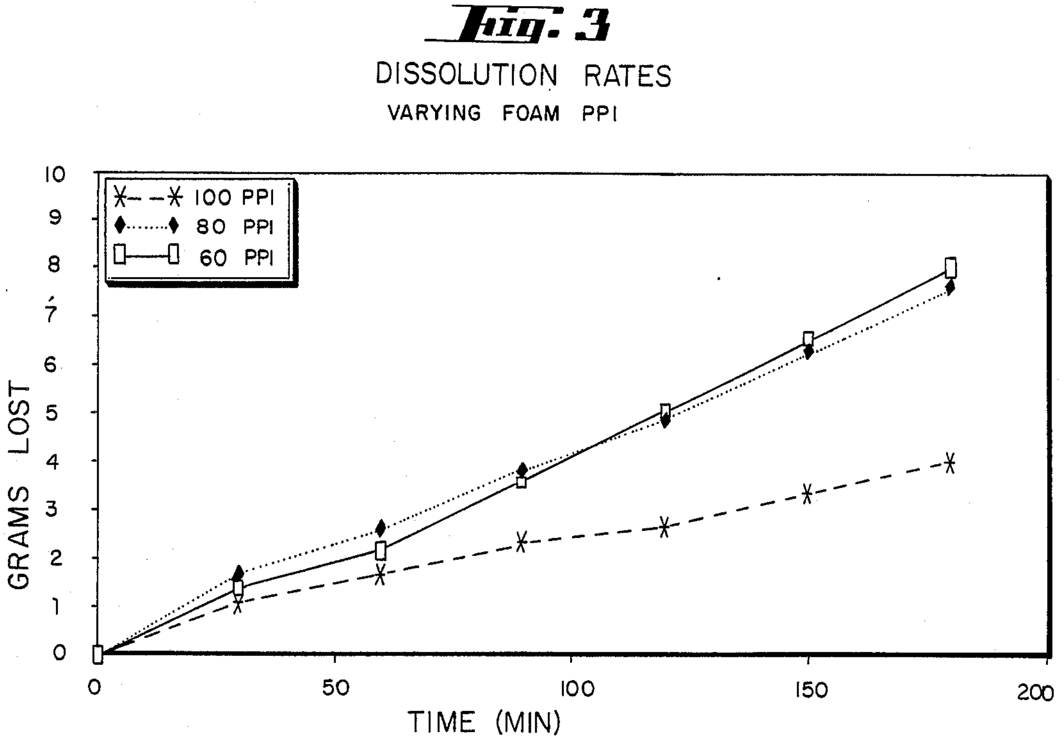
FIG. 3 is a graph comparing the dissolution rates as a function of pores per inch.
Figure 4:
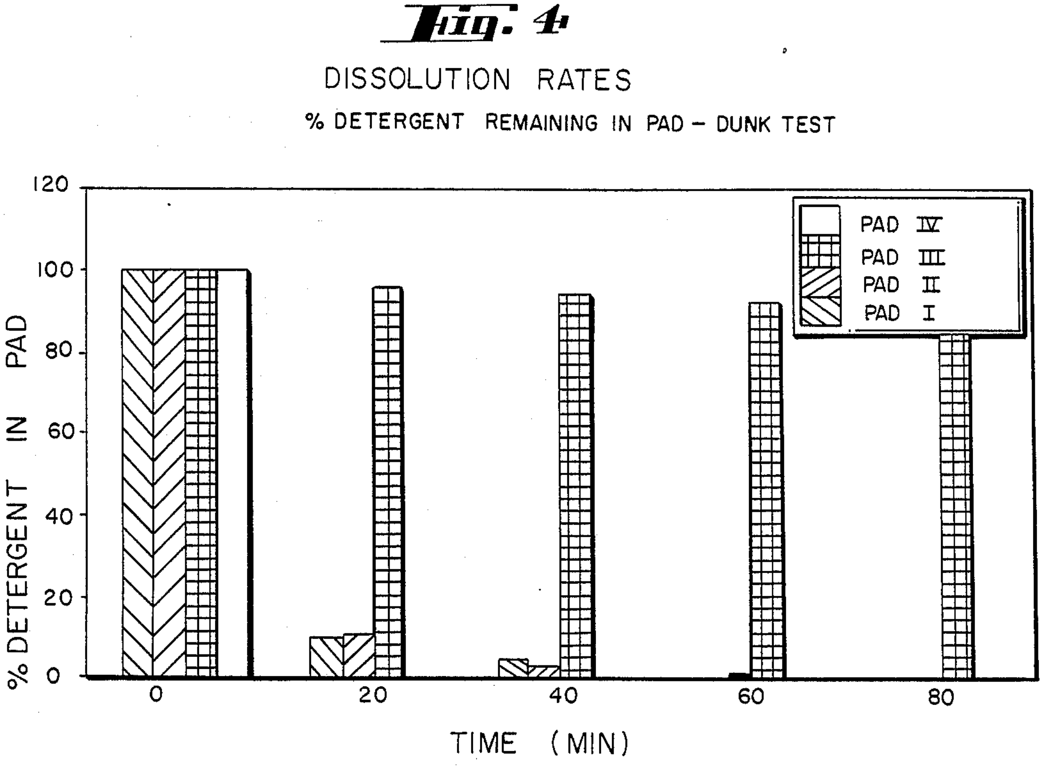
FIG. 4 is a graph comparing the dissolution rates of 4 pads using the dunk test

The data collected is presented in Table II below and is shown graphically in FIG. 3.

TABLE II

| | Grams lost after time in minutes | | | | | |
|---|---|---|---|---|---|---|
| Pores per inch | 30 | 60 | 90 | 100 | 150 | 180 |
| 60 | 1.4 | 2.2 | 3.7 | 5.0 | 6.5 | 8.0 |
| 80 | 1.7 | 2.6 | 3.8 | 4.9 | 6.3 | 7.6 |
| 100 | 1.1 | 1.7 | 2.3 | 2.6 | 3.3 | 3.9 |

It is apparent that the more ppi in a foam the longer the detergent will last. Foams having a ppi of 60, 80 or 100 have satisfactory results. A foam having a density of 2 lbs per cubic foot and 100 ppi is preferred.

Custom and reticulated foams were compared using the dunk test. The dissolution rates from custom foams and reticulated foams having 60 and 80 pores per inch were compared. The data collected is presented in Table III below and shown graphically in FIG. 1

TABLE III

| | Grams lost in minutes | | | | | |
|---|---|---|---|---|---|---|
| Foam | 30 | 60 | 90 | 120 | 150 | 180 |
| Reticulated 60 | 1.9 | 4.4 | 6.5 | 8.0 | 9.3 | 10.8 |
| Reticulated 80 | 2.0 | 4.0 | 5.9 | 7.4 | 9.4 | 10.7 |
| Custom 60 | 1.4 | 2.2 | 3.7 | 5.0 | 6.5 | 8.0 |
| Custom 80 | 1.7 | 2.6 | 3.8 | 4.9 | 6.3 | 7.6 |

It is apparent from these data that custom foams give superior results. The detergent loss was substantially less from custom foams.

A critical aspect of the scrubber is the life of the detergent in the scrubber. The detergent should last about as long as a scrubber so that the customer will not be required to use other products in combination with the scrubber. A paste formulation and a detergent bar were evaluated. The paste formulations contain about 20% water and are soft due to the high water content.

The detergent bar formulations contain about 6% water and a hardening agent and thus are very hard. The detergent bar formulation lasts longer but gives the product an unpleasant feel due to its hardness. The formulation selected combines the desirable properties of the detergent bar and paste formulations.

A satisfactory formulation contains 20–35% alkyl aryl sulfonate, 19–24% sodium carbonate, 1 to 2% magnesium sulfate and 30–50% sodium sulfate. Experimental evidence shows that the formulations containing the most sodium sulfate gave the best results. The preferred formulation contains 23% alkyl aryl sulfonate, 5.1% water, 23.6% sodium carbonate, 1.7% magnesium sulfate and 45.6% sodium sulfate. Perfume is added to the detergent to give the pad a lemony fragrance. The scrubber has no discernible odor.

FIG. 6 is a schematic diagram of the pad of the instant invention.

Referring now to FIG. 6 The scrubber surface shown at 10 is a polyester non-woven spray bonded with an acrylic binder. The binder content is about 60%. The upper foam portion 11 and the lower foam portion 13 are custom polyester polyurethane foams having a density of about 2 pounds per cubic foot and a porosity of about 100 pores per inch. The detergent bar is represented at 12.

The scrubber of the instant invention was designated Pad IV. The superiority of these pads was demonstrated by comparing the percent detergent remaining in the pads after a dunk test of up to 80 minutes. The pad of the instant invention was compared to 3 commercially available pads designated pad I, pad II and pad III. The data collected is set out in Table IV and is shown graphically in FIG. IV.

TABLE IV

| Pad | Percent detergent in pad after time in minutes: 0 | 20 | 40 | 60 | 80 |
|---|---|---|---|---|---|
| Pad I | 100 | 10 | 3 | 0 | 0 |
| Pad II | 100 | 11 | 5 | 1 | 0 |
| Pad III | 100 | 96.5 | 85 | 83 | 80 |
| Pad IV | 100 | less than 1 | 0 | 0 | 0 |

It is apparent from these data that the pad designated pad IV lost essentially all of its detergent after 20 minutes in the dunk test. Pad I lost 90% of its detergent and pad II lost 89%. In contrast, pad III, the pad of the instant invention lost only 3.5% of its detergent. Pads I, II and IV had lost essentially all of their detergent after 60 minutes. Pad III still had a considerable amount of detergent after 80 minutes in the dunk test.

Figure 5:
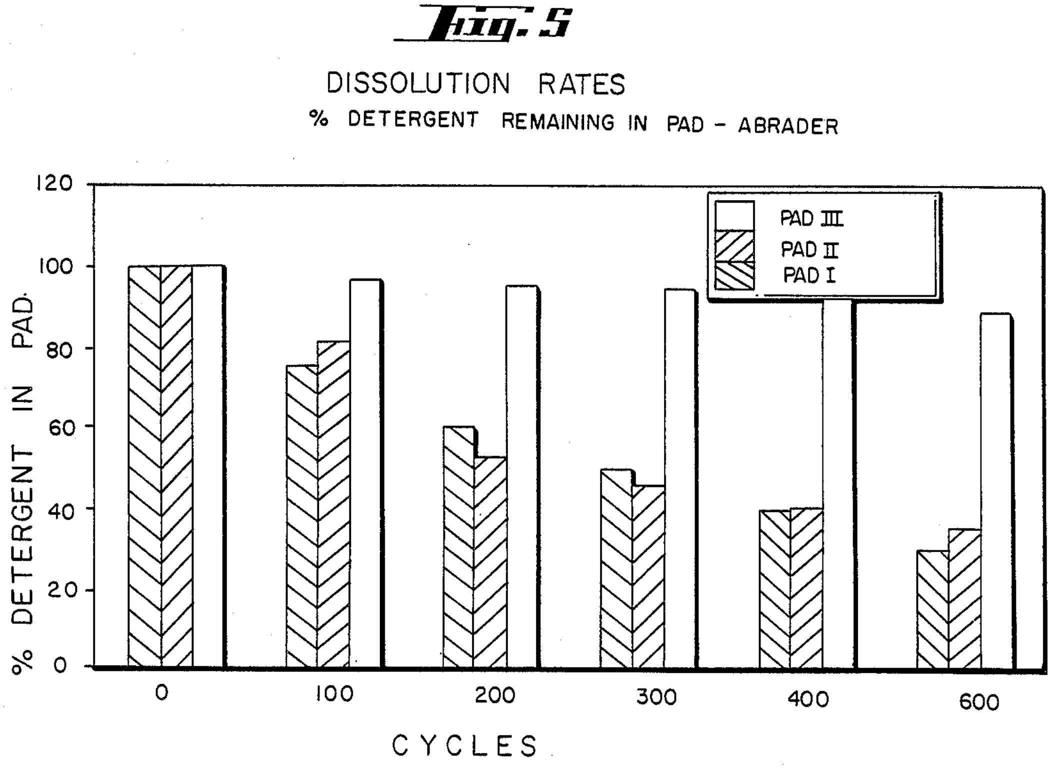
FIG. 5 is a graph comparing the dissolution rates of 3 pads using the abrader test.

The dunk test is a good test to measure the differences between formulations and foam types in scrubbers, but it is not representative of the actual way these scrubbers are used. The abrader test simulates the actual way these scrubbers are used. The abrader test consists of attaching a weight to a scrubber to simulate scrubbing and reciprocating the scrubber for several cycles across a ceramic tile in a trough of water. Afterwards the scrubbers are dried and the weight loss due to detergent use-up is recorded. Pads I, II and Pad III were subjected to the abrader test. The data collected this series of runs is set out in Table V below and is shown graphically in FIG. 5.

TABLE V

| Pad | Percent detergent in pad after cycles: 0 | 100 | 200 | 300 | 400 | 600 |
|---|---|---|---|---|---|---|
| Pad I | 100 | 70 | 62 | 56 | 50 | 36 |
| Pad II | 100 | 80 | 58 | 52 | 48 | 40 |
| Pad III | 100 | 95 | 93 | 90 | 90 | 85 |

Although the differences in the pads are not as dramatic as in the dunk test it is obvious that pad of the instant invention is superior to commercial pads I and II. Pad III retained 90% of its detergent after 400 cycles and 85% after 600 cycles. The other pads had lost at least half of their detergent after 400 cycles and almost two thirds of their detergent after 600 cycles.

Figure 7:
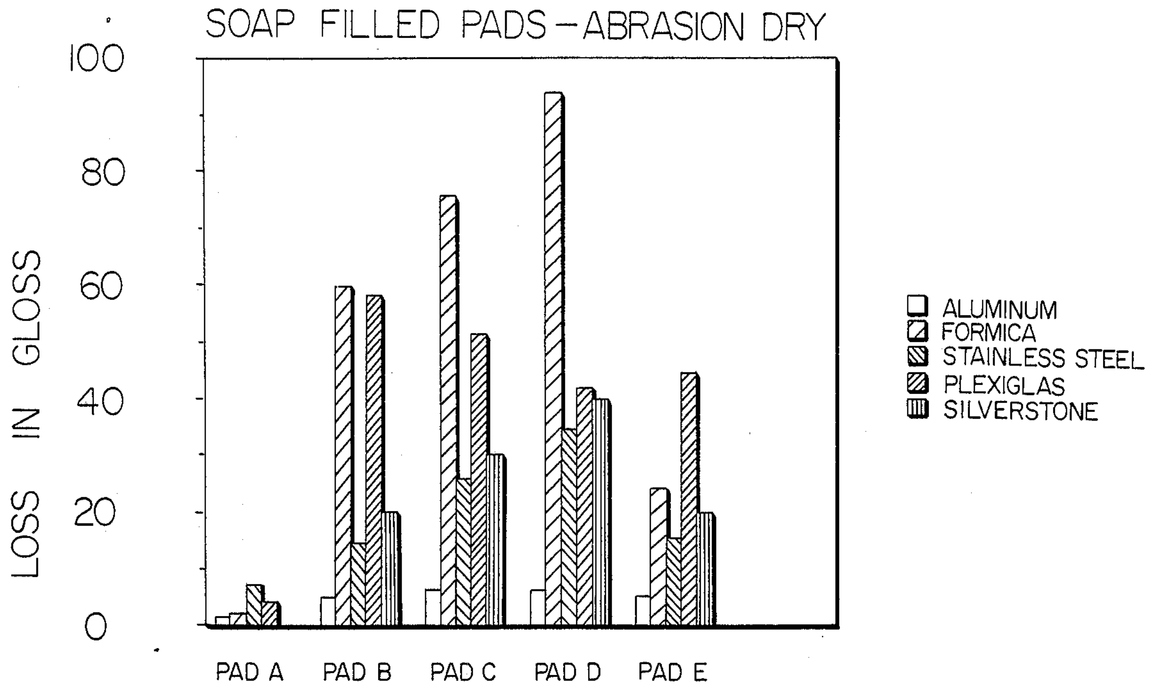
FIG. 7 is a graph comparing the loss of gloss using 5 dry pads.

One of the advantages of the pad of the instant invention is its safety to surfaces. This property was evaluated in runs in which the abrasion of dry soap filled pads were compared. The abrasion was measured as a function of loss in gloss using a 20° Gardner gloss meter. The abrasion test was carried out using a Gardner abrader with the application of a pressure of 16.7 grams per square centimeter. In the first of these tests dry pads were subjected to 20 cycles in the abrader test described above. The pad of the instant invention, designated pad A, was compared to four commercially availably pads designated pads B, C, D and E respectively. The data collected is set out in table VI below and is shown graphically in FIG. 7.

TABLE VI

| | SURFACE | | | | |
|---|---|---|---|---|---|
| | ALUMINUM* | FORMICA | STAINLESS STEEL | PLEXIGLAS | TEFLON COATED* UTENSILS |
| Pad A | 1 | 2.0 | 6.8 | 4.0 | 0 |
| Pad B | 5 | 59.8 | 14.2 | 58.3 | 20 |
| Pad C | 6 | 75.7 | 25.6 | 51.4 | 30 |
| Pad D | 6 | 94.0 | 34.4 | 41.9 | 40 |
| Pad E | 5 | 24.2 | 15.2 | 44.5 | 20 |

*for both of these surfaces a visual evaluation was made due to difficulty in measuring their gloss.

It is apparent from this date that Pad A, the pad of the instant invention, is superior to the commercially available pads. These pads caused at least a 20 fold increase in loss gloss when used on Teflon coated utensils when compared to Pad A, for example.

The test described above were repeated using the same soap filled pads. The test conditions were the same except that the pads were wet and the test was conducted for 400 hundred cycles.

Figure 8:
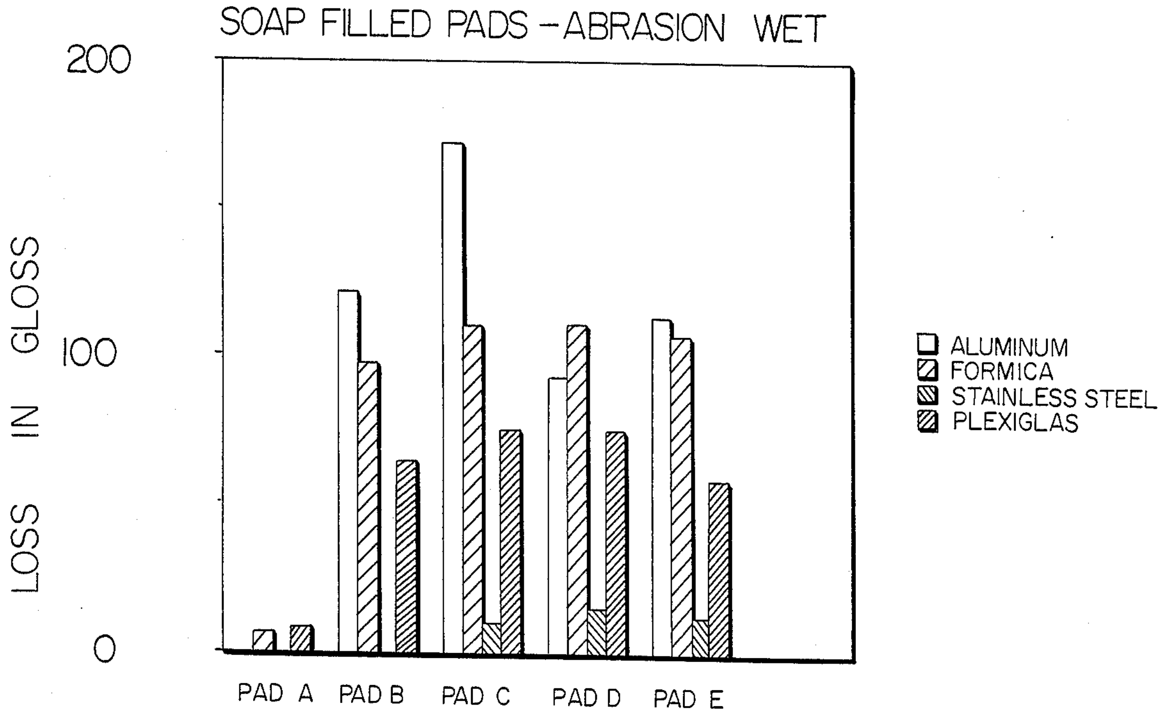
FIG. 8 is a graph showing the loss of gloss using 5 wet pads.

The data collected is set out in Table VII and shown graphically in FIG. 8.

TABLE VII

| | SURFACE | | | |
|---|---|---|---|---|
| SCRUBBER | ALUMINUM | FORMICA | STAINLESS | PLEXIGLAS |
| Pad A | 0 | 6.3 | 0 | 8.2 |
| Pad B | 120.8 | 97.1 | 0 | 63.7 |
| Pad C | 172.1 | 109.7 | 9.6 | 74.7 |
| Pad D | 93.4 | 111.6 | 15.5 | 75.9 |

TABLE VII-continued

| | SURFACE | | | |
|---|---|---|---|---|
| SCRUBBER | ALUMINUM | FORMICA | STAIN-LESS | PLEXI-GLAS |
| Pad E | 114.8 | 108.1 | 12.9 | 59.3 |

The superiority of Pad A, the pad of the instant invention is apparent from the data. The comparison of loss in gloss in aluminum is particularly impressive.

The pads are prepared in a manner such that a minimal amount of water is allowed to pass through the detergent and consequently it takes some time to generate foam the first time the pad is used. A liquid soap solution is sprayed on both sides of this pad so that when wetted suds are immediately generated. On subsequent uses the detergent trapped in the pores of the pad from previous use is easily dissolved and suds are easily generated.

The perfume in the detergent is also in the soap solution and gives the pad a lemony fragrance. When not in use the foam keep most of the fragrance inside the pad so that the pad has no undesirable odor.

The last step in the process of preparing the scrubber pads is sealing the edges of the pads. The edges are sealed by the application of an adhesive using standard techniques. When this technique is used the edge of the pads is of the same thickness as the rest of the pad. The pads can also be made of a heat sealable material and the edges heat sealed.

Although the polyester polyurethane foams are peferred other foam types such as cellulose foams, latex foams and polyethylene foams may be used.

Other non-woven materials such as those having more or less binder and other fiber types may be used.

Obviously, many modification and variations of the invention may be made without departing from essence and scope thereof and the only limitations, that should be applied as are indicated in the appended claims.

What is claimed is:

1. A process for preparing a scrubber pad characterized by good cleaning properties, safety to surfaces and soap retention which comprises the steps of:

(a) selecting a polyester polyurethane foam having a density of about 2 to about 6 pounds per cubic foot and about 60 to 100 pores per inch.

(b) bonding a polyester spun bonded non-woven material having about 60 percent acrylic latex spray to one side of said foam, (c) positioning a detergent bar formulation containing alkyl aryl sulfonate, soldium carbonate, sodium sulfate, magnesium sulfate and perfume, in said foam, (d) cutting the foam product into pads of the desired shape and size.

(e) sealing the edges of said pads by applying an adhesive thereto, and (f) recovering the scrubber pad product.

2. The process according to claim 1 wherein said foam is a custom foam having a density of about 2 pounds per cubic foot and contains about 100 pores per inch.

3. The process according to claim 1 wherein said pad is impregnated with a detergent formulation consisting essentially of 28–30 percent alkyl aryl sulfonate, 1–2 percent magnesium sulfate, 20–25 percent sodium carbonate, 44 to 46 percent sodium sulfate, 4 to 6 percent water and less than 1 percent perfume.

4. A process for preparing a scrubber pad characterized by good cleaning properties, safety to surfaces and soap retention which comprises the steps of:

(a) selecting a polyester polyurethane foam having a density of about 2 pounds per cubic foot and 100 pore per inch, (b) bonding a polyester spun bonded non-woven material containing about 60 percent acrylic latex to one side of said foam, (c) impregnating said foam with a detergent formulation containing about 23 percent alkyl aryl sulfonate, about 23.6 percent sodium carbonate, about 1.7 percent magnesium sulfate, about 45.6 percent sodium sulfate and about 5.1 percent water.

(d) cutting the impregnated product into pads of the desired shape and size, (e) sealing the edges of said pads by applying an adhesive thereto, and (f) recovering the scrubber pad product.

5. A scrubber pad characterized by good cleaning properties, safety to surfaces and soap retention comprising a backing member bonded to a custom foam having the desired density and porosity impregnated with a detergent formulation containing alkyl aryl sulfonate, sodium carbonate, magnesium sulfate, sodium sulfate and perfume, the edges of said pad being sealed with an adhesive.

6. The scrubber pad according to claim 5 wherein said backing member is a polyester spun bonded non-woven material containing about 60% acrylic latex.

7. The pad according to claim 5 wherein the foam is a custom foam having a density of about 2 pounds per cubic foot and containing about 100 pores per inch.

8. The pad according to claim 1 wherein the detergent formulation containing 28 to 30% alkyl aryl sulfonate, 1–2% magnesium sulfate, 20–25 percent sodium carbonate, 44–47 percent sodium sulfate and 0.5 percent perfume.

9. A scrubber pad for characterized by good cleaning properties, safety to surfaces, and detergent retention comprising a polyester non-woven material containing about 60 percent acrylic latex spray bonded to one side of a custom polyester polyurethane foam having a density of about 2 pounds per cubic foot and about 100 pores per inch, said foam impregnated with a detergent formulation consisting essentially of about 23–24 percent sodium carbonate about 23 percent alkyl aryl sulfonate, about 1.7 percent magnesium sulfate, about 46–47 percent sodium sulfate and about 0.5 percent perfume said pad having a generally rectangular shape and having the edges thereof sealed with an adhesive.

* * * * *